United States Patent [19]

Knaack et al.

[11] Patent Number: 4,573,731
[45] Date of Patent: Mar. 4, 1986

[54] VEHICLE STORAGE DRAWER UNIT

[75] Inventors: Howard L. Knaack; Kenneth F. Weger, Jr., both of Cary, Ill.

[73] Assignee: Knaack Manufacturing Company, Crystal Lake, Ill.

[21] Appl. No.: 437,444

[22] Filed: Oct. 28, 1982

[51] Int. Cl.⁴ ............... B60R 11/06; A47B 88/04; A47B 88/20

[52] U.S. Cl. ............... 296/376; 224/42.42; 312/330 R; 312/333; 312/341 R

[58] Field of Search .......... 296/37.1, 37.14, 24 R, 296/37.6; 312/330 R, 330 SM, 296, 333, 12, 100, 183, 341 R; 224/310, 311, 42.42

[56] References Cited

U.S. PATENT DOCUMENTS

| | | | |
|---|---|---|---|
| 1,148,238 | 7/1915 | Kline | 312/329 |
| 1,162,006 | 11/1915 | Whitney et al. | 312/296 |
| 1,625,945 | 4/1927 | Kuhn | 312/108 |
| 1,927,922 | 9/1933 | Crum | 296/37.1 |
| 2,104,912 | 1/1938 | Streeter | 312/341 R |
| 2,145,106 | 1/1939 | Anderson | 220/22 |
| 2,229,785 | 1/1941 | Wray | 312/246 |
| 2,319,423 | 5/1943 | Maihack | 224/42.42 |
| 2,379,157 | 6/1945 | Jones | 312/333 |
| 2,572,081 | 10/1951 | Wallance | 312/330 R |
| 2,704,699 | 3/1955 | Evans | 312/330 |
| 2,762,677 | 9/1956 | Reeves | 312/341 R |
| 2,784,027 | 3/1957 | Temp | 296/156 |
| 2,867,471 | 1/1959 | Coon, Jr. | 296/156 |
| 2,978,153 | 4/1961 | Brindle | 224/42.42 |
| 2,992,055 | 7/1961 | Kass | 312/341 R |
| 3,581,929 | 6/1971 | Guenard et al. | 220/22 |
| 3,647,105 | 3/1972 | Keeslar | 220/22 |
| 3,764,048 | 10/1973 | Gore | 224/42.41 |
| 3,826,529 | 7/1974 | Wood | 296/24 R |
| 3,973,814 | 8/1976 | Entrikin | 312/330 R |
| 4,112,539 | 9/1978 | Hagen | 312/330 R |
| 4,121,876 | 10/1978 | Ratti | 312/330 R |
| 4,167,233 | 9/1979 | Hare | 220/72 |
| 4,215,896 | 8/1980 | Drouin | 296/37.6 |
| 4,283,083 | 8/1981 | Johnson | 296/24 R |
| 4,288,134 | 9/1981 | Knaack et al. | 312/100 |
| 4,328,989 | 5/1982 | Childers | 224/311 |
| 4,370,007 | 1/1983 | Fler | 312/333 |
| 4,469,364 | 9/1984 | Rafi-Zadeh | 296/24 R |

OTHER PUBLICATIONS

Cam Lever Brochure (C139).

*Primary Examiner*—Robert B. Reeves
*Assistant Examiner*—Dennis H. Pedder
*Attorney, Agent, or Firm*—Wood, Dalton, Phillips Mason & Rowe

[57] ABSTRACT

A drawer-type storage unit for use in a vehicle having a floor defining a floor space having a horizontally accessible access position. The storage unit defines a raised floor when installed on the vehicle floor which is adapted to support a load in a manner similar to the vehicle floor itself. The storage unit includes a drawer formed of a plurality of U-shaped channels having the legs thereof welded together and having hemmed top edges. The drawer includes a front wall which is recessed within the storage unit housing in the closed position thereof and sealed to the top and sidewalls of the housing so as to effectively prevent passage of water and other environmental materials into the drawer in the closed position. The rear of the housing is sealingly closed. The storage unit includes a number of different rigidifying structures to provide a high strength and rigidity therein. The drawer is carried on a heavy duty roller bearing slider for facilitated movement thereof between the closed and open positions notwithstanding tools and the like in the drawer having substantial weight, such as up to 500 pounds or more. The top wall of the unit is provided with a diamond plate surface for facilitated use as a raised floor. The unit is provided with suitable skids adapted for removable bolting of the unit to the vehicle floor for facilitated installation and removal when desired.

25 Claims, 5 Drawing Figures

U.S. Patent    Mar. 4, 1986    4,573,731
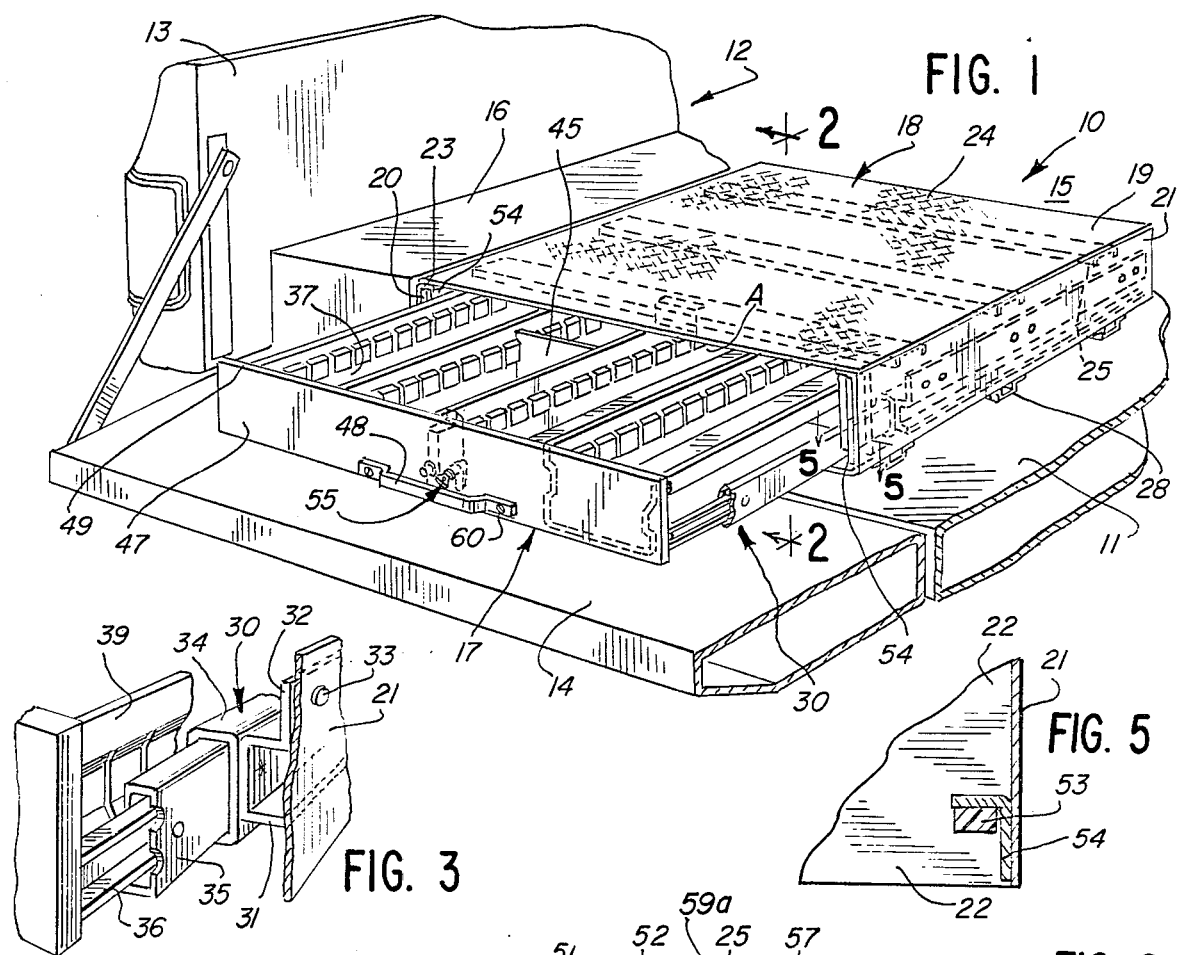
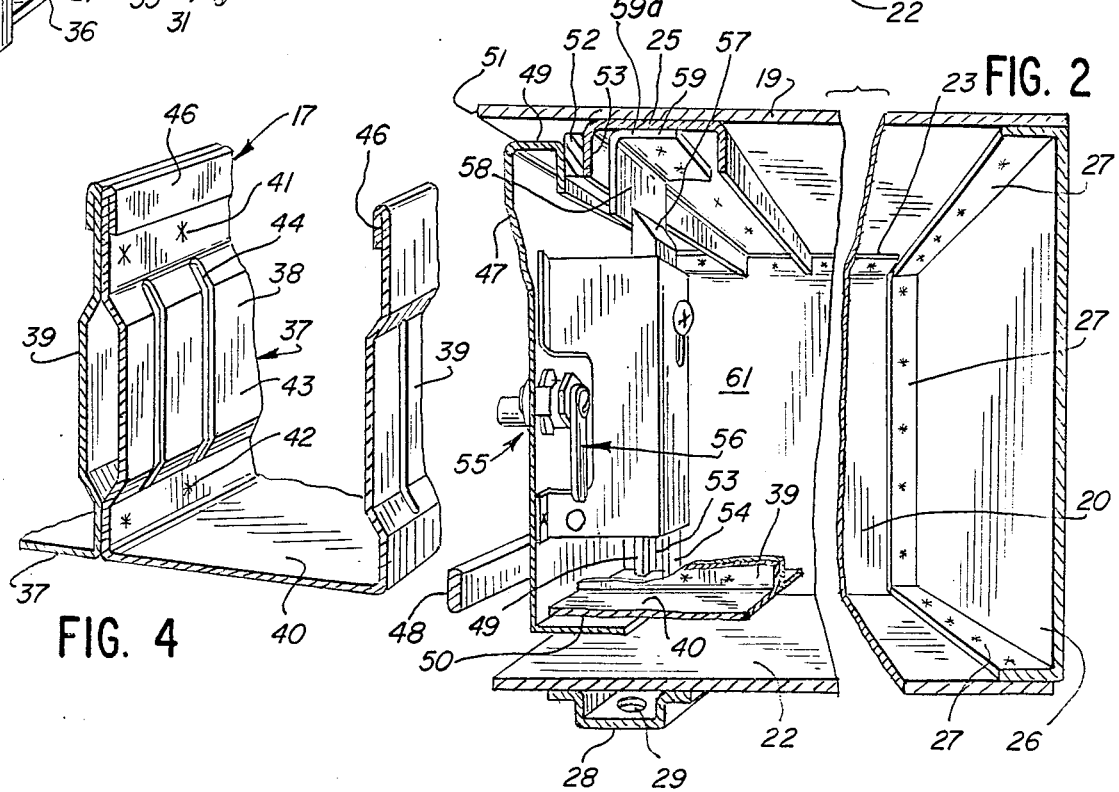

VEHICLE STORAGE DRAWER UNIT

BACKGROUND OF THE INVENTION

1. Field of the Invention

This invention relates to storage units and in particular to storage units adapted to be installed in vehicles, such as pickup trucks and the like.

2. Description of the Background Art

In U.S. Pat. No. 2,784,027, Conrad R. Temp discloses a drawer unit for pickup trucks wherein the bed is provided with upstanding sides, with a false floor supported from the truck sides. The drawer is fitted between the truck bed and the floor and is movably carried on mounting means mounted to the truck bed.

In U.S. Pat. No. 4,283,083 of Raymond L. Johnson, a vehicle-attached article carrier is disclosed having a rain deflector comprising a lip on the lid of the article carrier.

Everett C. Kline discloses, in U.S. Pat. No. 1,148,238, a container having a plurality of sections secured together to define the overall cabinet structure.

In U.S. Pat. No. 3,581,929, E. F. Guenard et al disclose trays for supporting cylindrical earth cores wherein the tray is formed of a plurality of rails assembled in side-by-side disposition so that the tray can be made to have any desired number of compartments.

SUMMARY OF THE INVENTION

The present invention comprehends an improved drawer unit adapted to be removably installed in a vehicle for improved weatherproof storage of tools and the like, while yet permitting facilitated accessibility when desired.

The drawer unit is constructed to define a self-contained, weatherproof unit that may be mounted on the bed of a pickup truck, on the floor of a van, etc.

The top wall of the unit defines a raised floor on which the user may walk or store relatively heavy objects, as desired.

The top wall is supported on the sidewalls and end walls of the housing in a strong, rigid manner.

The top wall may be provided with a suitable nonskid surface for improved traffic safety.

The housing defines a front opening drawer space which is arranged to open to an access position on the vehicle, such as at the tailgate of the pickup truck.

The storage drawer is constructed to be complementary to and removably received in the drawer space and is mounted on removable drawer slide holders for facilitated movement between an exposed, accessible position and an enclosed, storage position, notwithstanding the provision of relatively heavy materials in the drawer.

The unit includes means for rigidifying the top wall in association with the top wall itself and in association with the sidewalls, and includes means for rigidifying the entire structure so as to maintain the arrangement of the drawer slide means.

In the illustrated embodiment, the drawer slide means comprise self-aligning, self-contained, and self-lubricating means.

The invention comprehends the provision of a rear wall in the housing sealingly joined to the side, bottom, and top walls to effectively seal the rear of the housing drawer space while additionally rigidifying the assembly.

The sidewalls, in the illustrated embodiment, define upright extensions of the bottom wall and include inturned distal flanges for supporting the top wall.

In the illustrated embodiment, the drawer is defined by a plurality of U-channels having facially joined upstanding legs defining front-to-rear drawer dividers and bights defining the bottom wall of the drawer.

In the illustrated embodiment, the upper edges of the U-channel legs are folded downwardly to define a hemmed, exposed upper edge.

In the illustrated embodiment, the legs of the channels are provided with stiffening ribs extending longitudinally thereof and provided with spaced vertically extending slots for selectively receiving transverse divider walls for compartmentalizing the drawer, as desired.

The U-channel legs are welded together above and below the stiffening ribs to provide a strong drawer unit.

In the illustrated embodiment, the drawer includes a front wall recessed substantially within the housing in the drawer space in the closed position for effectively preventing rain and the like from passing into the drawer. In the illustrated embodiment, the drawer is recessed at least about $\frac{1}{2}"$ under the housing top wall in the closed position and sealing means are provided for sealing the drawer to the housing at the front opening.

In the illustrated embodiment, means are provided for adjustably positioning the front wall of the drawer in the closed position for limiting the amount of compression of the sealing means.

The invention comprehends the provision of such a drawer assembly wherein manually operable lock means are provided and include the means for adjustably positioning the drawer front wall.

In the illustrated embodiment, the adjusting means includes an angle member having a depending leg disposed to be engaged by the lock means in the drawer locking position thereof, with the leg being angularly positionable to provide the desired adjustment.

In the illustrated embodiment, the drawer mounting means comprises brackets removably secured to the housing sidewalls and accessible slide means including a mounting portion removably fixed to the brackets so as to permit ready installation and removal of the drawer slide means, as desired.

the invention comprehends that the storage unit be removably fixedly installed on the floor of the automotive vehicle in the space immediate above the floor so as to define a raised floor. The unit is shallow so as to provide for minimum raising of the floor while yet having a substantial volume as a result of the wide and deep construction thereof.

The housing of the unit is rigidified so as to permit substantial loading on the top wall defining the raised floor while yet permitting easy movability of the drawer which itself may be carrying a heavy load of tools and the like.

By providing a low center of gravity of the substantial weight which may be carried in the drawer, improved safety in the use of the vehicle is provided. For facilitated installation, the bottom wall of the housing is provided with underlying skids permitting facilitated bolted securing of the unit to the vehicle body and further rigidifying the unit.

Thus, the storage unit of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary perspective view of a drawer-type storage unit embodying the invention installed on a pickup truck form of automotive vehicle;

FIG. 2 is a fragmentary enlarged vertical section taken substantially along the line 2—2 of FIG. 1;

FIG. 3 is a fragmentary enlarged perspective, with portions broken away, of the drawer mounting means;

FIG. 4 is a fragmentary perspective sectional view of the drawer illustrating in greater detail the formation thereof from a plurality of U-shaped channels; and FIG. 5 is a fragmentary enlarged horizontal section taken substantially along the line 5—5 of FIG. 1.

DESCRIPTION OF THE PREFERRED EMBODIMENT

In the exemplary embodiment of the invention as disclosed in the drawing, a drawer-type storage unit generally designated 10 comprises a self-contained unit adapted to be installed on the floor 11 of an automotive vehicle generally designated 12. In the illustrated embodiment, vehicle 12 comprises a pickup truck with floor 11 comprising the flat bed of the truck disposed between sidewalls 13 thereof. As shown, a tailgate 14 is provided on the vehicle for selectively closing the rear of the storage space 15 overlying floor 11, in which the drawer-unit 10 is installed.

The truck bed may be further provided with side storage boxes 16.

As shown in FIG. 1, the storage space 15 is accessible at a rear access position when the tail-gate 14 is moved to the lowered position. Storage unit 15 includes a drawer generally designated 17 which is selectively moved between an open arrangement at the access position upwardly of the housing 18 of the unit, or fully within the housing within a closed position when desired.

As shown in FIG. 1, housing 18 includes a top wall 19 defining a raised floor above the bed 11 on which the user may walk or place loads, as desired.

As further shown, housing 18 includes a left sidewall 20 and a right sidewall 21 upstanding from a bottom wall 22. The distal upper end of the sidewalls is inturned to define a horizontal support flange 23 to which the side edges of the top wall 19 are secured as by welding. In the illustrated embodiment, top wall 19 is formed of relatively heavy plate metal having a diamond nonskid grip surface 24 for improved safety in using the top wall 19 as a raised floor on the truck bed.

As illustrated in FIGS. 1 and 2, top wall 19 is provided with a plurality of inverted U-channels 25 secured to the underside thereof as by welding for rigidifying the top wall. In the illustrated embodiment, the top wall comprises a heavy gauge steel wall so that with the additional rigidification provided by the reinforcing channels, the wall is maintained rigid under heavy loads.

As further illustrated in FIG. 2, rear wall 26 of the housing is provided with inturned peripheral flanges 27 welded to the top wall, sidewalls, and bottom wall of the housing to further rigidify the top wall and seal the drawer space 61 within the housing at the rear thereof from the ambient elements.

As further illustrated in FIGS. 1 and 2, bottom wall 22 is provided with a plurality of transverse flanged channel skids 28 secured to the underside of the bottom wall as by welding. The skids are provided with suitable bolt openings 29 for use in securely bolting the storage unit 10 to the truck bed 11.

Drawer 17 is carried for facilitated movement between the open and closed positions by a pair of heavy duty drawer slides generally designated 30 mounted one each to the sidewalls 20 and 21. As shown in FIG. 3, the drawer slide is removably mounted to the sidewall by a U-channel bracket 31 having an upstanding flange 32. Flange 32 is removably secured to the sidewall by rivets 33.

The drawer slide, as best seen in FIG. 3, includes a tubular housing 34 secured to the U-channel 31 as by welding and extensibly receiving a plurality of nested slides 35 and 36 carried on rolling bearings (not shown).

Rivets 33 comprise hardened steel rivets which may be readily removed when desired so as to permit replacement of the drawer support when desired. The flange channel 31 is preferably made of heavy gauge steel so as to provide additional lateral strength to the housing.

As best seen in FIG. 1 and 4, drawer 17 is formed of a plurality of U-channels 37 having facially joined, upstanding legs 38 and 39 and a lower bight 40. Adjacent legs 38 and 39 are secured together by welds 41 and 42, respectively above and below an inwardly projecting, longitudinally extending reinforceing rib 43. As shown, the rib is provided with a plurality of longitudinally spaced parallel slots 44 for selectively receiving divider plates 45 which, illustratively, may be formed of coated steel and having side edges slidably receivable in the closed slots 44 of the opposite legs 38 and 39 to serve as adjustable bin dividers.

As further shown in FIG. 4, the upper edge 46 of the legs is downturned to define an upper hand edge providing improved strength to the drawer and protection against user injury in use of the drawer.

In the illustrated embodiment, the reinforcing rib 43 extends the full longitudinal extent of the legs, and the slots 44 extend the full height of the reinforcing ribs, with the welds 41 and 42 providing high strength to the drawer construction.

As further shown in FIGS. 1 and 2, drawer 17 includes a front panel 47 provided with a heavy duty handle 48 for use in moving the drawer between the open position of FIG. 1 and the closed position of FIG. 2. As shown in FIG. 2, front panel 47 includes a distal angle flange 49 extending along the upper edge and side edges thereof, with an inturned planar flange 50 at the lower edge. As shown in FIG. 2, the front panel is received fully within the drawer space 27 in the closed position of the drawer, and more specifically is recessed rearwardly of the front edge 51 of the top wall 19 at least approximately ½". Thus, the drawer is effectively protected against entry of water, such as rain water and the like, falling on the top wall from entering into the drawing as a result of the recessed disposition of the front wall.

In addition, flange 49 of the front wall panel 47 is sealed to the housing 18 through a resilient seal member 52 secured to the front leg 53 of the front reinforcing channel 25, as shown in FIG. 2.

As further shown in FIG. 5, vertical seal strips 53 are provided on mounting angles 54 secured to the sidewalls as by welding for sealing engagement by the vertical L-flange edges 49 of the front panel. Thus, the front panel is effectively sealed along the top and side edges thereof to the housing, further preventing entry of undesirable elements from the ambient atmosphere.

Drawer 17 is further provided with a heavy duty latch generally designated 55 including a keyed lock generally designated 56 for securely retaining the drawer in the closed position when desired.

As shown in FIG. 2, latch 55 includes a latch member 57 selectively engageable with a downturned leg 58 of a strike generally designated 59 secured to the front reinforcing channel 25 as by welding. In the closed position of the drawer, as shown in FIG. 2, latch member 57 is received behind leg 58 to retain the drawer in a preselected, innermost position against the resilient outward biasing of the seal portions 52 and 53. The invention comprehends the provision of a strike member 59 permitting adjustment of the angular disposition of leg 58 as by deflecting the leg from the leg portion 59a of the strike secured to the channel 25 to provide desired compression of the seal in the closed position of the drawer.

Thus, drawer 17 provides a high strength, readily positionable drawer movably disposed in housing 18 with improved heavy duty slide means, permitting the drawer to store tools and the like having weight up to approximately 500 lbs. or more for facilitated access thereto when desired. The heavy duty handle 55 is removably secured to the front panel 47 as by bolts 60.

Thus, the storage unit 10 is adapted for use in an automotive vehicle defining a floor and a space above the floor having an access region at one edge thereof. The storage unit is adapted to be removably fixedly installed in the floor space to provide facilitated access to tools, parts, and the like, placed in the compartmentalized drawer.

The drawer is movably received in the cabinet housing for movement through a front access region from a closed position within the cabinet housing.

The unit provides a raised floor rigidly supported above the vehicle floor and includes reinforcing means for providing sufficient strength in the unit to permit use of the raised floor substantially similarly to the intended use of the vehicle floor. In the illustrated embodiment, the vehicle comprises a pickup truck, it being obvious to those skilled in the art that the vehicle may comprise other vehicles, such as vans and the like, with similar improved storage provided by the unit therein.

In the illustrated embodiment, the unit cabinet, or housing, has width a major portion of the width of the floor portion on which the unit is installed, and in the illustrated embodiment, where the unit is installed on the bed of a pickup truck, the unit may have a width of approximately 43½", a length of approximately 50", and a height of approximately 8¾". In the illustrated embodiment, the drawer has a length of approximately 48", with the width of the longitudinal compartments defined by the U-shaped channels 37 being approximately 9⅜". In the illustrated embodiment, the drawer is formed of 16-gauge steel, with the top wall of the housing being formed of 12-gauge diamond plate.

As indicated above, the storage unit may be readily installed on the vehicle floor by bolting the mounting skids securely thereto, while yet providing facilitated removal from the vehicle when desired.

The rolling bearing slider drawer mounting means provides for easy movement of the drawer between the opened and closed positions, notwithstanding the carrying in the drawer of substantial weights of material, such as up to 500 lbs. or more.

By providing middle thicknesses at the top of the drawer walls as a result of the juxtaposition of the downturned flanges 46, rigidly maintained drawer configuration is obtained effectively avoiding deformation as by inadvertent striking of the drawer walls by the objects being placed in or removed from the drawer. At the same time, the hemmed edges 46 effectively minimize damage to the articles by providing rounded edges thereat.

As shown in FIG. 1, the self-contained storage unit 10 is adapted for installation in a conventional truck bed, with the space above the unit being horizontally accessible at an access position resulting from the lowered tailgate 14. The top wall 19 of the unit may comprise a relatively strong member and, illustratively, may be formed of a heavy gauge steel. As further shown in FIGS. 1 and 2, the sidewalls 20 and 21 comprise integral upright extensions of the bottom wall 22 and further define inturned distal flanges 23 supporting the top wall 19. As further illustrated in FIG. 2, the strike member 59 includes one leg portion 59a secured to the chaneel 25 and, thus, to the top wall 19, and a depending leg 58, the angular disposition of which may be deflected to provide desired controlled compression of the seal 52 in the closed position of the drawer.

As further illustrated in FIGS. 1 and 3, the flange channels 31 extend from the front to the rear of each sidewall for further providing lateral stability to the housing. As best seen in FIG. 1, the storage unit defines a flat cabinet 10 having a steel plate top wall 19 defining a raised floor and a front opening A through which the drawer 17 is selectively movable. As shown, the storage unit 10 has a width a major portion of the width of the floor 11.

The foregoing disclosure of specific embodiments is illustrative of the broad inventive concepts comprehended by the invention.

We claim:

1. For use in a vehicle having a conventional bed with the space immediately above the bed being horizontally accessible at an access position, a selectively accessible self-contained storage unit providing a raised floor on said bed, said storage unit comprising:

a housing having sidewalls, a bottom wall, a top wall and a rear wall cooperatively defining a front opening drawer space, said housing being constructed to be installed on said bed to open to the access position;

a drawer complementary to and received in said drawer space; and means for movably mounting said drawer to said sidewalls for selective movement between a closed position within said drawer space and an open position wherein the drawer extends outwardly from the housing through said access position, said drawer comprising a plurality of U-channels having facially joined upstanding legs defining front-to-rear drawer dividers and bights defining the bottom wall of the drawer.

2. The storage unit of claim 1 wherein the upper edges of said U-channel legs are folded downwardly to define a hemmed exposed upper edge.

3. The storage unit of claim 1 wherein said U-channel legs are each provided with a stiffening rib extending longitudinally of the channel.

4. The storage unit of claim 1 wherein said U-channel legs are each provided with a stiffening rib extending longitudinally the full length of the channel.

5. The storage unit of claim 1 wherein said U-channel legs are each provided with a stiffening rib extending longitudinally of the channel and provided with spaced, vertically extending slots for selectively receiving transverse divider walls.

6. The storage unit of claim 1 wherein said U-channel legs are each provided with a stiffening rib extending longitudinally of the channel and provided with spaced slots extending vertically the full height of the stiffening ribs for selectively receiving transverse divider walls.

7. The storage unit of claim 1 wherein said U-channel legs are each provided with a stiffening rib extending longitudinally of the channel, said U-channel legs being welded together above and below said stiffening ribs.

8. The storage unit of claim 1 wherein said means for mounting the drawer to the housing sidwalls comprises brackets removably secured to the housing sidewalls, and extensible slide means including a mounting portion fixed to said brackets.

9. The storage unit of claim 8 wherein said extensible slide means comprises means for supporting up to approximately 500 pounds in said drawer while permitting ready movement of said drawer between said closed and open positions.

10. The storage unit of claim 8 wherein said drawer includes a front wall provided with a removably mounted heavy duty handle for moving said drawer between said closed and open position with up to 500 pounds of material in said drawer.

11. The storage unit of claim 8 wherein said brackets comprise flanged channels extending one each from adjacent the front to the rear of each sidewall for further providing lateral stability to the housing.

12. The storage unit of claim 8 further including reinforcing means associated with said housing for providing sufficient strength to said top wall thereof to permit use of said top wall substantially similar to intended use of the vehicle floor.

13. The automotive vehicle storage unit of claim 8 wherein said vehicle comprises a pickup truck.

14. The automotive vehicle storage unit of claim 8 wherein said housing has a width a major portion of the width of said bed.

15. For use in a vehicle having a conventional bed with the space immediately above the bed being horizontally accessible at an access position, a selectively accessible self-contained storage unit providing a raised floor on said bed, said storage unit comprising:

a housing having sidewalls, a bottom wall, a top wall and a rear wall cooperatively defining a front opening drawer space, said housing being constructed to be installed on said bed to open to the access position;

a drawer complementary to and received in said drawer space;

means for movably mounting said drawer to said sidewalls for selective movement between a closed position within said drawer space and an open position wherein the drawer extends outwardly from the housing through said access position, said drawer comprising a plurality of U-channels having facially joined upstanding legs defining front-to-rear drawer dividers and bights defining the bottom wall of the drawer; and means for rigidifying said top wall to permit use thereof similar to the use permitted by the conventional vehicle bed, such as a user walking thereon and the carrying of heavy materials thereon.

16. The storage unit of claim 15 wherein said vehicle includes upstanding vehicle sidewalls at opposite sides of the bed, said sidewalls defining top edges, and said housing being constructed to be removably fixedly installed as a unit to said bed to open to the access position with said top wall disposed below the level of said top edges of the vehicle sidewalls.

17. The storage unit of claim 15 wherein said housing is constructed to be removably secured to said bed.

18. The storage unit of claim 15 wherein said top wall is provided with nonskid means on the upper surface thereof.

19. The storage unit of claim 15 wherein said rigidifying means comprises a plurality of mounted U-channels on the underside of the top wall.

20. The storage unit of claim 15 wherein said top wall comprises a heavy gauge steel wall.

21. The storage unit of claim 15 wherein said rear wall is sealingly joined to each of said side, bottom and top walls to further rigidify the top wall and seal said drawer space at the rear therefrom from ambient elements.

22. The storage unit of claim 15 wherein said means for movably mounting the drawer comprises flanged channels secured one each to said side walls, and drawer slide means mounted to said flanged channels.

23. The storage unit of claim 15 wherein said means for movably mounting the drawer comprises flanged channels removably riveted one each to said side walls, and drawer slide means mounted to said flanged channels.

24. The storage unit of claim 15 wherein said sidewalls comprise integral upright extensions of said bottom wall and define inturned upper distal flanges supporting said top wall.

25. The storage unit of claim 15 wherein means are provided for rigidifying said bottom wall comprising spaced channel structures thereon.

* * * * *